(12) United States Patent
Cousin et al.

(10) Patent No.: US 11,619,478 B2
(45) Date of Patent: Apr. 4, 2023

(54) METHOD FOR THE DIMENSIONAL CONTROL OF A TURBOMACHINE COMPONENT

(71) Applicant: SAFRAN AIRCRAFT ENGINES, Paris (FR)

(72) Inventors: Roger Georges Cousin, Moissy-Cramayel (FR); Arnaud Alexandre Vincent, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/607,253

(22) PCT Filed: Apr. 23, 2020

(86) PCT No.: PCT/FR2020/000149
§ 371 (c)(1),
(2) Date: Oct. 28, 2021

(87) PCT Pub. No.: WO2020/221969
PCT Pub. Date: Nov. 5, 2020

(65) Prior Publication Data
US 2022/0187051 A1 Jun. 16, 2022

(30) Foreign Application Priority Data
Apr. 29, 2019 (FR) ...................................... 1904508

(51) Int. Cl.
*G01B 5/008* (2006.01)
*G01B 21/04* (2006.01)
*G01M 13/00* (2019.01)

(52) U.S. Cl.
CPC ........... *G01B 5/008* (2013.01); *G01B 21/042* (2013.01); *G01M 13/00* (2013.01)

(58) Field of Classification Search
CPC ............................ G01B 5/008; G01B 21/0142
(Continued)

(56) References Cited

U.S. PATENT DOCUMENTS 2,839,836 A * 6/1958 Fuller ................... F01D 21/003
33/552
4,896,430 A * 1/1990 Burton ................. F01D 21/003
33/552
(Continued)

FOREIGN PATENT DOCUMENTS

| CN | 104316016 A | 1/2015 |
|---|---|---|
| FR | 2989610 A1 | 10/2013 |
| JP | S60159601 A | 8/1985 |

OTHER PUBLICATIONS

International Search Report dated Jul. 3, 2020, issued in corresponding International Application No. PCT/FR2020/000149, filed on Apr. 23, 2020, and its English translation thereof, 2 pages.
(Continued)

*Primary Examiner* — George B Bennett
(74) *Attorney, Agent, or Firm* — Christensen O'Connor Johnson Kindness PLLC

(57) ABSTRACT

Methods for the dimensional inspection of a turbomachine component to be inspected are provided. The turbomachine component includes a first surface delimited by a second peripheral surface substantially transverse to the first surface and a profile defined by a numerical theoretical model with a theoretical surface corresponding to the first surface, the first surface having larger dimensions than the second peripheral surface. The method includes determining theoretical points on the theoretical surface of the numerical theoretical model; calibrating calibration points on the first surface of the component to be inspected; calculating an offset axis for each theoretical point with respect to a corresponding calibration point; and acquiring control
(Continued)

points on the second peripheral surface of the component to be inspected from the offset axis.

12 Claims, 2 Drawing Sheets

(58) Field of Classification Search
USPC .................................................. 33/503, 547
See application file for complete search history.

(56) References Cited

U.S. PATENT DOCUMENTS

| | | | |
|---|---|---|---|
| 7,024,787 B2* | 4/2006 | Varsell | G01B 3/14 |
| | | | 33/562 |
| 7,685,731 B1* | 3/2010 | Petroskie | G01B 5/25 |
| | | | 33/645 |
| 7,809,523 B2* | 10/2010 | Hunter | G01B 21/04 |
| | | | 33/503 |
| 8,959,785 B2* | 2/2015 | Craig | G01B 11/026 |
| | | | 33/645 |
| 2020/0182601 A1* | 6/2020 | Beignon | G01B 5/213 |

OTHER PUBLICATIONS

Written Opinion of the International Searching Authority, dated Nov. 5, 2020, issued in corresponding International Application No. PCT/FR2020/000149, filed on Apr. 23, 2020, and its English translation thereof, 3 pages.

* cited by examiner

METHOD FOR THE DIMENSIONAL CONTROL OF A TURBOMACHINE COMPONENT

CROSS-REFERENCE TO RELATED APPLICATIONS

This application is a National Stage of International Application No. PCT/FR2020/000149, filed Apr. 23, 2020, which claims priority to French Patent Application No. 1904508, filed Apr. 29, 2019, the entire disclosures of which are hereby incorporated by reference.

TECHNICAL FIELD OF THE INVENTION

The present invention relates to the manufacture of turbomachine components and more particularly to a method for the dimensional control of a turbomachine component such as a turbine vane produced by casting or forging.

BACKGROUND

Improving the performances of the turbomachines requires the production of mechanical components such as vanes with an optimized aerodynamic profile. The double bodies turbomachines comprise, for example, blade ring for the low pressure turbine stages with dimensions (thicknesses or widths) of a few millimeters. These blade ring are generally manufactured by casting and pouring metal into a mold using the technique referred to as lost wax, which allows the desired shape of the vane to be obtained directly without the need for the implementation of machining steps to obtain the finished component.

However, the casting technique does not always allow the desired fineness to be achieved for certain parts of the blade ring and it is necessary to perform an additional machining in order to provide aerodynamically optimized components. The machining requires a very specific parameterization which is defined empirically from a theoretical component and the very precise profile data of the component to be obtained.

A dimensional control of these components is carried out to check whether a machining of these components is necessary, during the machining, or even after machining, and to validate their conformity after machining. Due to the tolerances accepted for foundry components, the very small dimensions and possible deformations of these components, the control is long and tedious. This control is usually operated with a Coordinate-Measuring Machine (CMM). The latter carry out a palpation or a measuring with or without contact using a palpation element and the data from the theoretical component. An example of control is described in the documents FR-A1-2989610, CN-B-104316016 and JP-A-S60159601.

This control proved to be more complicated for the vane shrouds of the turbomachine. Indeed, the shroud, which is located at a radially outer end of the blade, has a complex shape with a relatively small measuring area and radiused edges. However, for particular components, a reference point is determined from which the control of the component must start and is located on the shroud. If, for example, the component has tolerance problems as explained above, there is such a large offset between the reference point of the theoretical component and that of the component to be controlled that the palpation sensor will start measuring at an incorrect position. This can lead to a lack of accuracy when controlling the component. To remedy this, the operator may have to change the settings of the machine or move the component or the palpation element manually until the correct reference point is found on the component to be controlled.

One of the objectives of the applicant is in particular to provide a faster, automatic and inexpensive method for the dimensional control of a turbomachine component.

SUMMARY OF THE INVENTION

We achieve this objective by means of a method for the dimensional control of a turbomachine component to be controlled comprising a first surface delimited by a second peripheral surface transverse to the first surface and a profile defined by a numerical theoretical model with a theoretical surface corresponding to the first surface, the first surface having larger dimensions than the second peripheral surface, the method comprising the following steps:
  determining theoretical points on the theoretical surface of the numerical theoretical model;
  calibrating calibration points on the first surface of the component to be controlled;
  calculating an offset axis for each theoretical point with respect to a corresponding calibration point,
  acquiring control points on the second peripheral surface of the component to be controlled from the offset axis.

Thus, this solution allows to achieve the above-mentioned objective. In particular, this method allows to check the conformity of the component although, in this case, the shroud of the vane, is not in the theoretical starting position foreseen in the theoretical model and to determine more quickly the points to be controlled. In other words, even if the shroud is not in the right position, this method allows palpation to begin at the right place on the surface to be checked. This control is also facilitated by the first surface having larger dimensions than the second surface to be controlled, which is generally very narrow. The determination, the calibration and the calculation of the offset axis can be done in less than ten seconds which is very fast.

The dimensional controlled method also comprises one or more of the following characteristics, taken alone or in combination:
  the theoretical points are defined in accordance with the surface and/or the geometry of the first surface.
  the theoretical points are arranged close to the periphery of the theoretical surface of the theoretical model.
  the step of calculating the offset axis comprises a step of comparing the spatial data of each theoretical point of the theoretical model and the spatial data of each corresponding calibration point.
  the comparison step comprises the following steps:
    drawing a straight line between at least one theoretical point and a corresponding calibration point;
    measuring a spatial offset between the theoretical point and the calibration point;
    calculating a displacement axis of a machining tool of the machined surfaces of the component to be controlled,
    determining the director cosines of the offset axis from theoretical normals to the theoretical surface of the theoretical model at the level of the theoretical point, the straight line and the displacement axis of the machining tool.
  the acquisition step comprises a step of calculating the spatial coordinates of the points to be inspected on the component by applying the offset axis to the theoretical coordinates of the theoretical points to be controlled.

- the method comprises the positioning of a palpation element opposite the first surface of the component to be controlled in order to carry out the calibration step, the axis of the palpation element being orthogonal to the first surface.
- the calibration step and the acquisition step are carried out by an control device of the Coordinate-Measuring Machine type.
- between two and eight theoretical points are defined during the determination step.
- the turbomachine component is a turbomachine movable vane comprising a blade and a shroud arranged at a radially outer end of the blade, the shroud comprising a radially inner surface delimited by a radial peripheral surface, the first surface being the radially inner surface of the shroud and the second surface being the radial peripheral surface of the shroud.
- the Coordinate-Measuring Machine comprises the palpation element.
- in the acquisition step, the axis of the palpation element is orthogonal to the second peripheral surface.

BRIEF DESCRIPTION OF FIGURES

Further characteristics and advantages of the invention will become apparent from the following detailed description, for the understanding of which reference is made to the attached drawings in which.

DETAILED DESCRIPTION OF THE INVENTION

Figure 1:
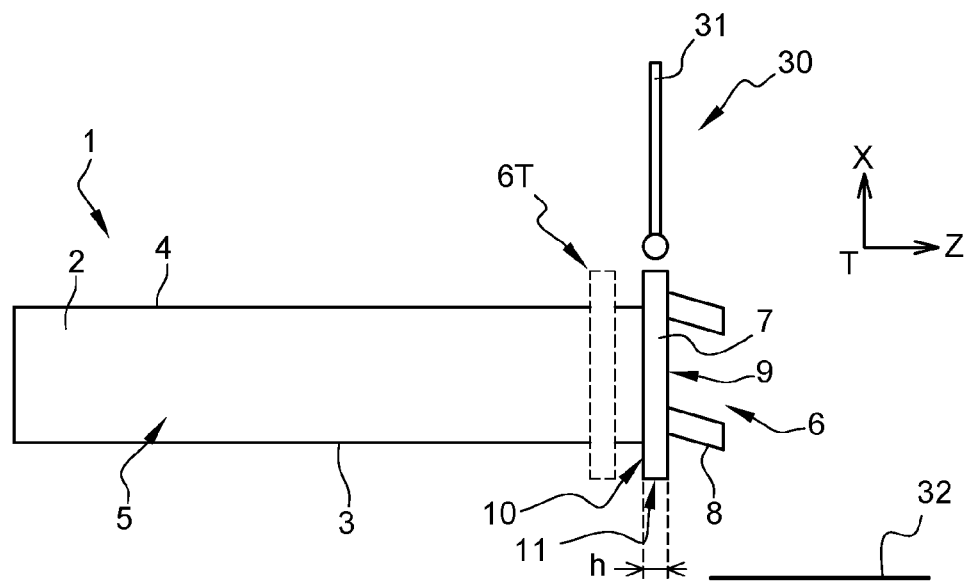
FIG. 1 schematically represents a turbomachine vane to be controlled, on which there is a difference in position between a shroud of the theoretical component and a shroud of the vane to be controlled.

FIG. 1 illustrates a turbomachine component coming out of the wax lost casting operations and intended to be controlled to check if its dimensions are conform to a theoretical component or model obtained by computer-aided design or drafting (CAD/CAD) by means of software provided for this purpose.

In particular, it is a movable vane 1 of a low pressure turbine. Of course, this vane can be a distributor vane or a vane intended to equip another member of the turbomachine.

A turbomachine (not shown), in particular a double-flow with a longitudinal axis, generally comprises a gas generator with a fan mounted upstream. In the present invention, and in general, the terms "upstream" and "downstream" are defined with respect to the flow of fluids in the turbomachine, and here along the longitudinal axis X. The gas generator comprises a gas compressor assembly (which may comprise a low pressure compressor and a high pressure compressor), a combustion chamber and a turbine assembly (which may comprise a high pressure turbine and a low pressure turbine). The gas generator is traversed by a primary aerodynamic flow circulating in a secondary vein and generated by the fan. A secondary aerodynamic flow is also generated by the fan and circulates around the gas generator in a secondary vein, the latter being coaxial with the primary vein.

Each turbine comprises one or more stages which are arranged successively along the longitudinal axis of the turbomachine. Each turbine stage comprises a vane movable wheel forming a rotor and a vane stationary wheel forming a stator. The vanes of this stator are referred to as distributor vanes.

Each movable wheel comprises an annular disc centered on the longitudinal axis and a plurality of movable vanes mounted on the periphery of the disc. These vanes are distributed circumferentially and evenly around the disc of the movable wheel. Each movable wheel is arranged downstream of a distributor vane stationary wheel.

With reference to FIG. 1, the movable vane 1 comprises a root (not shown) and a blade 2 extending from the root along a radial axis Z (perpendicular to the longitudinal axis when the vane is installed in the turbomachine). The root is intended to fit into a groove with a corresponding shape of the disc, which for this purpose comprises a plurality of grooves evenly distributed around its periphery.

The blade 2 comprises a leading edge 3 and a trailing edge 4 which are opposite, here along the longitudinal axis X. Each blade 2 is arranged in the aerodynamic flow such that the leading edge 3 is positioned upstream of the trailing edge 4. The leading edge 3 and the trailing edge 4 are connected by an intrados surface and an extrados surface 5 which are opposite along a transverse axis. The transverse axis T is perpendicular to the longitudinal axis X and to the radial axis Z.

The movable vane 1 also comprises a shroud 6 which extends the blade 2. This shroud 6 is located at a radially outer end of the blade 2 and transversely to the blade. In particular, the shroud 6 is arranged radially opposite the root of the vane. The shroud 6 typically comprises a platform 7 intended to form a radially outer wall portion of the primary vein. The shroud 6 is provided with wipers 8 which extend radially from a radially outer surface 9 of the platform 7. A radially inner surface 10 is opposite the radially outer surface 9 and oriented generally toward the root of the vane. The radially inner surface 10 is delimited by a radial peripheral surface 11 which connects the radially inner 10 and radially outer 9 surfaces.

The radially inner surface is defined in a first plane XT (defined by the longitudinal and transverse axes) which is perpendicular to the radial axis. The radially inner surface is planar or substantially planar. The latter has larger dimensions than the peripheral surface 11. As can be seen in particular in FIG. 1, the peripheral surface 11 has height h along the radial axis which is very small or narrowed compared to the width l of the radially inner surface 10.

Figure 4:
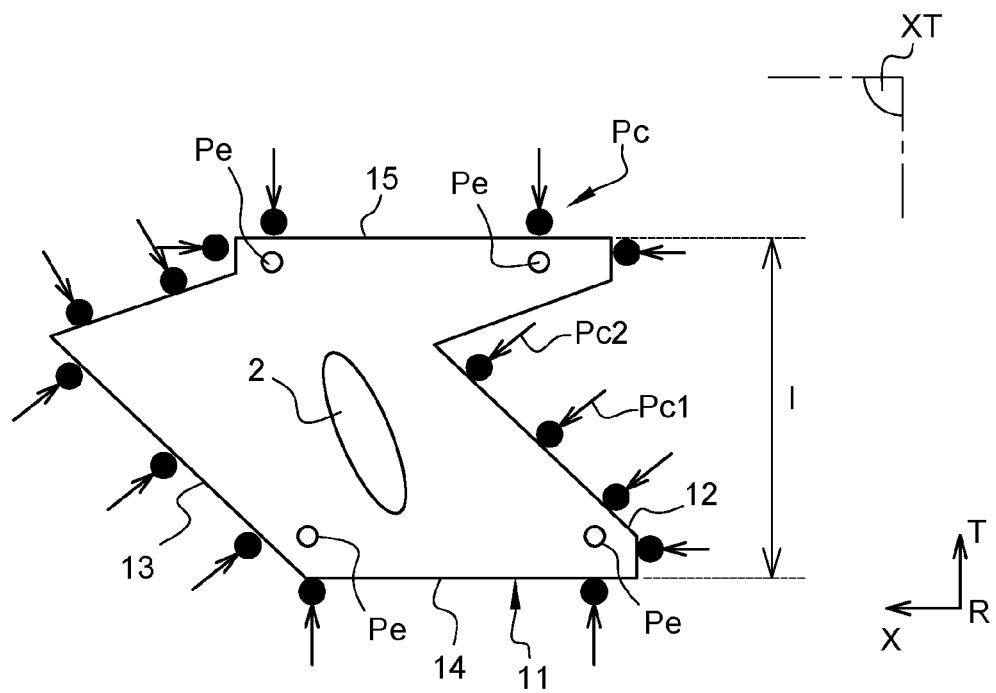
FIG. 4 shows schematically different positions of a control device such as a coordinate-measuring machine according to the invention.

As can be seen in FIG. 4, the platform 7 also extends along the longitudinal axis X. The shroud 6 comprises a first edge 12 and a second edge 13 opposite each other along the transverse axis T and which are each intended to make circumferential contact with a shroud of an adjacent vane. This allows the vanes to block axially and circumferentially the displacements. In addition, the platform comprises an upstream side 14 and a downstream side 15 which are opposite each other along the longitudinal axis. The upstream and downstream sides 14, 15 and the first and second edges 12, 13 define the radial peripheral surface 11.

The dimensional control is carried out from a control device 30 (which may be of the type of a Coordinate-Measuring Machine (CMM)). The control device 30 comprises a palpation element 31 which is intended to measure points here without contact on the surface of the vane and in particular of the shroud. Typically, the control device 30 further comprises an electronic control system or microcontroller which comprises calculating means and a memory.

FIG. 1 also shows in dotted lines the position of a shroud 6T corresponding to the theoretical definition of the shroud of the theoretical vane as designed in a theoretical model of the design software. We can see an offset in the position of the shroud 6T of the theoretical vane and the shroud 6 of the vane to be controlled along the radial axis. The theoretical shroud comprises a radially inner theoretical surface 10T and a theoretical peripheral surface 11T transverse to the radially inner theoretical surface. The radially inner theoretical surface corresponds to the radially inner surface 10 and the theoretical peripheral surface corresponds to the radial peripheral surface 11.

We would like the turbomachine vane to be controlled as quickly as possible despite a possible offset in the position of the theoretical shroud in relation to the shroud of the real component to be controlled or measured, in order to know whether it is in conformity or must be directed towards the scrap components.

For this purpose, we apply a dimensional control method of the component to be controlled, here the movable vane, described below. This method advantageously comprises a step of positioning the vane to be controlled on a support 32 equipping the control device 30. In particular, the component to be controlled is positioned on the support 32 so that its reference frame coincides with the support reference frame 32. The vane reference frame is composed of the longitudinal, radial and transverse axes.

The radially inner surface 10 of the platform is oriented in space. Here, the first plane XT of the radially inner surface 10 is parallel to the vertical with reference to FIG. 4.

Figure 2:
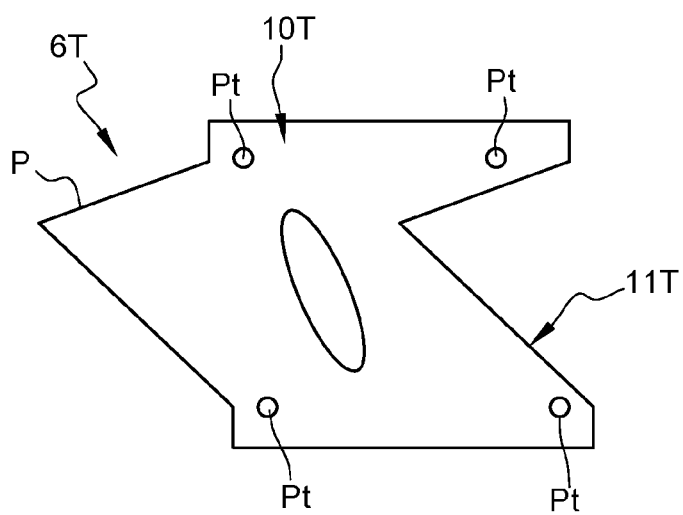
FIG. 2 is a schematic and top view of the surface of an example of shroud of a turbomachine vane to be controlled.

A step of determination of theoretical points Pt is carried out on the theoretical surface 10T of the theoretical shroud 6T of the theoretical component (see FIG. 2). These are designed by calculation in the theoretical model, for example, at the same time as the design of said theoretical model of the vane to be manufactured (which will be controlled). These theoretical points are also defined according to the surface to be measured or the geometry of the shroud. These theoretical points correspond to the reference point for starting the control of the various points to be controlled in a theoretical component. In this example, at least two theoretical points are determined. In this example, four theoretical points are determined as shown in FIG. 2.

A calibration of calibration points Pe or reference points is carried out on the surface of the shroud, here of the radially inner surface 10 of the vane to be controlled (see FIG. 4). In this example, at least two calibration points are determined. This step is carried out by the palpation element 31 being moved so that it faces the radially inner surface. In particular, during the calibration step, the axis of the palpation element 31 is orthogonal to the radially inner surface of the shroud. This allows to determine the position of the component. Also, the displacement of the palpation element is substantially normal to the surface to be calibrated. Note that the surface is not completely planar. These calibration points on the component to be controlled must correspond to the theoretical points on the component to be controlled. In this example, four calibration points are calibrated.

With reference to FIG. 2, the theoretical points (as well as the calibration points) are arranged where the thickness or height of the shroud is lowest. In the present example, the theoretical points are arranged close to or as close as possible to the periphery P of the theoretical surface 10T of the theoretical component. This is in order to be close to the points to be controlled later on the shroud and to allow to control the conformity of the component to be controlled. These points to be controlled are defined in the theoretical model of the CAD/CAD software.

According to the method, a calculation of an offset axis of at least one theoretical point with respect to the corresponding calibration point is then carried out. During this step, a comparison is performed between the spatial or three-dimensional data of the theoretical point of the theoretical model and the corresponding calibration point on the component to be controlled. This comparison is advantageously performed in the electronic control system. Advantageously, all the theoretical points are compared with the corresponding calibration points. This allows to check if the calibration points are in the right position and correspond to the spatial coordinates of the theoretical points.

Figure 3:
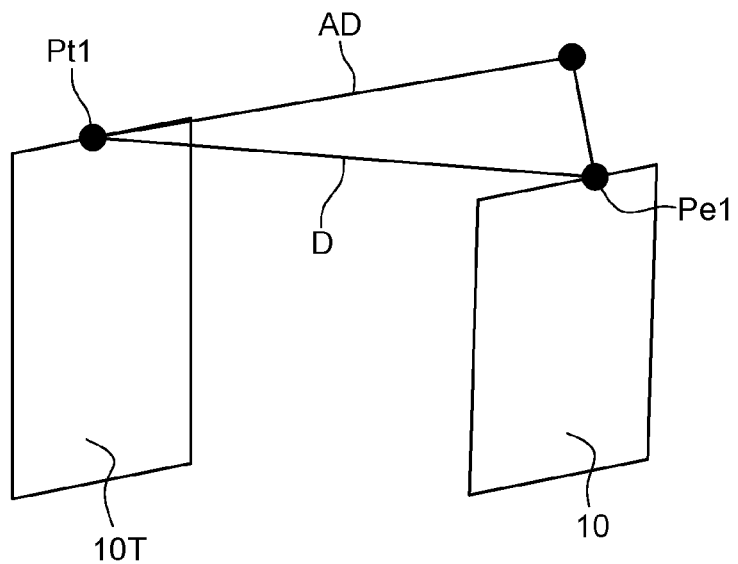
FIG. 3 is a schematic view of an example of a spatial offset between a theoretical plane and an actual plane.

To this end, as can be seen schematically in FIG. 3, a straight line D is drawn between the theoretical point Pt1 and the calibration point Pe1 (in the electronic control system). We check if there is a spatial offset between the theoretical point and the corresponding calibration point. According to this FIG. 3, the calibration point does not correspond to the theoretical point in terms of positions and spatial coordinates and it is necessary to determine this spatial offset.

The system determines the displacement axis of the machining tool (after the component has been molded) on the machined surfaces of the component to be controlled. Since the machining parameters are defined in advance, the tool displacement axis can be derived. It is deduced the director cosines (csx, csy, csz in the reference frame of the theoretical component) of the vector of the offset axis. The director cosines are advantageously constant.

The director cosines are determined from theoretical normals to the theoretical surface (corresponding to the radially inner surface) of the theoretical component at the level of the theoretical point Pt, the straight line D and the displacement axis of the machining tool.

Once the offset axis is determined, the system calculates or recalculates the three-dimensional coordinates of the points Pc to be controlled by applying this offset axis AD.

On FIG. 4, we see a step of acquisition of various points Pc1, Pc2 at the level of the radial peripheral surface 11 of the shroud 6 of the component to be controlled. This step allows to control that the component and in particular the dimensions of the shroud 6 comply with the required tolerances.

This method has been described for controlling the peripheral surface using the radially inner surface of the shroud as a reference surface. Of course, the reference surface may be the radially outer surface and the surface to be controlled is the peripheral surface transverse to and adjacent to the radially inner surface.

The invention claimed is:

1. A dimensional control method for dimensional control of a turbomachine component to be controlled comprising a first surface delimited by a second peripheral surface transverse to the first surface and a profile defined by a numerical theoretical model with a theoretical surface corresponding to the first surface, the first surface having larger dimensions than the second peripheral surface, the method comprising:
   determining theoretical points on the theoretical surface of the numerical theoretical model;
   calibrating calibration points on the first surface of the turbomachine component to be controlled;
   calculating an offset axis for each of the theoretical points with respect to a corresponding one of the calibration points; and acquiring control points on the second peripheral surface of the component to be inspected from the offset axis.

2. The dimensional control method according to claim 1, wherein the theoretical points are determined in accordance with at least one of a surface or a geometry of the first surface.

3. The dimensional control method according to claim 1, wherein the theoretical points are arranged close to a periphery of the theoretical surface of the theoretical model.

4. The dimensional control method according to claim 1, wherein calculating the offset axis comprises comparing spatial data of each of the theoretical points of the theoretical model and spatial data of each of the corresponding calibration points.

5. The dimensional control method according to claim 4, wherein comparing the spatial data comprises:
  drawing a straight line between at least one of the theoretical points and a corresponding one of the calibration points;
  measuring a spatial offset between the theoretical point and the corresponding calibration point between which the straight line is drawn;
  calculating a displacement axis of a machining tool of machined surfaces of the turbomachine component to be controlled,
  determining director cosines of the offset axis from theoretical normals to the theoretical surface of the theoretical component at a level of the theoretical point, the straight line, and the displacement axis of the machining tool.

6. The dimensional control method according to claim 1, wherein acquiring the control points comprises calculating spatial coordinates of points to be controlled on the turbomachine component by applying the offset axis to the theoretical points.

7. The dimensional control method according to claim 1, further comprising positioning a palpation element opposite the first surface of the turbomachine component to be controlled for calibrating the calibration points, wherein an axis of the palpation element is orthogonal to the first surface.

8. The dimensional control method according to claim 1, wherein calibrating the calibration points and acquiring the control points are carried out by a Coordinate-Measuring Machine type control device.

9. The dimensional control method according to claim 1, wherein acquiring the control points comprises acquiring between two and eight theoretical points.

10. The dimensional control method according to claim 1, wherein the turbomachine component is a turbomachine movable vane comprising a blade and a shroud arranged at a radially outer end of the blade, the shroud comprising a radially inner surface delimited by a radial peripheral surface, the first surface being the radially inner surface and the second peripheral surface being the radial peripheral surface.

11. The dimensional control method according to claim 8, wherein the Coordinate-Measuring Machine type control device comprises the palpation element.

12. The dimensional control method according to claim 7, wherein during acquiring the control points, the axis of the palpation element is orthogonal to the second peripheral surface.

* * * * *